(12) United States Patent
Handte et al.

(10) Patent No.: US 11,405,343 B2
(45) Date of Patent: Aug. 2, 2022

(54) TECHNIQUES FOR EXTENSIBLE MESSAGE INDEXING

(71) Applicant: Facebook, Inc., Menlo Park, CA (US)

(72) Inventors: Winston Felix Popowicz Handte, New York, NY (US); Sonjeev Jahagirdar, New York, NY (US); Zardosht Kasheff, New York, NY (US); John Reed Riley, New York, NY (US)

(73) Assignee: META PLATFORMS, INC., Menlo Park, CA (US)

( * ) Notice: Subject to any disclaimer, the term of this patent is extended or adjusted under 35 U.S.C. 154(b) by 75 days.

(21) Appl. No.: 15/858,607

(22) Filed: Dec. 29, 2017

(65) Prior Publication Data

US 2019/0207892 A1    Jul. 4, 2019

(51) Int. Cl.
*H04L 51/04* (2022.01)
*H04L 51/00* (2022.01)
*H04L 51/234* (2022.01)

(52) U.S. Cl.
CPC .............. *H04L 51/16* (2013.01); *H04L 51/04* (2013.01); *H04L 51/34* (2013.01)

(58) Field of Classification Search
CPC .......... H04L 51/04; H04L 51/12; H04L 51/16
USPC .......................................................... 709/206
See application file for complete search history.

(56) References Cited

U.S. PATENT DOCUMENTS

| | | |
|---|---|---|
| 5,970,491 A | 10/1999 | Schreiber et al. |
| 7,117,246 B2 | 10/2006 | Christenson et al. |
| 7,356,616 B2 | 4/2008 | Kaler et al. |
| 8,706,822 B2 * | 4/2014 | Ickman ............... G06F 9/542 |
| | | 709/206 |
| 9,055,044 B2 | 6/2015 | Takagi et al. |
| 2002/0112008 A1 | 8/2002 | Christenson et al. |
| 2002/0120710 A1 | 8/2002 | Chintalapati et al. |
| 2002/0198945 A1 | 12/2002 | Thomas |
| 2004/0049546 A1 | 3/2004 | Yoshida |
| 2004/0215724 A1 | 10/2004 | Smoot et al. |
| 2005/0033845 A1 | 2/2005 | Perepa et al. |
| 2005/0198169 A1 | 9/2005 | Holten et al. |
| 2005/0267941 A1 | 12/2005 | Addante et al. |
| 2006/0271784 A1 | 11/2006 | Bolosky et al. |
| 2007/0016613 A1 | 1/2007 | Foresti et al. |
| 2007/0299973 A1 | 12/2007 | Borgendale et al. |
| 2008/0282352 A1 | 11/2008 | Beddoe et al. |
| 2010/0017441 A1 | 1/2010 | Todd |
| 2010/0121914 A1 | 5/2010 | Jeon et al. |
| 2011/0022640 A1 | 1/2011 | Franco et al. |
| 2012/0054775 A1 | 3/2012 | Garza et al. |
| 2012/0210334 A1 * | 8/2012 | Sutedja ............... G06Q 10/107 |
| | | 719/314 |
| 2014/0244589 A1 | 8/2014 | Egami et al. |
| 2014/0280626 A1 | 9/2014 | Girish et al. |

(Continued)

*Primary Examiner* — Sibte H Bukhari
(74) *Attorney, Agent, or Firm* — KDB Firm PLLC

(57) ABSTRACT

Techniques for extensible message indexing are described. In one embodiment, an apparatus may comprise a client front-end component of a messaging system operative to receive an incoming message from a client device; identify a sending client service for the incoming message at the client front-end component; determine a service identifier index value for the sending client service at the client front-end component; and store the incoming message in a message queue using the service identifier index value. Other embodiments are described and claimed.

17 Claims, 14 Drawing Sheets

(56) References Cited

U.S. PATENT DOCUMENTS

| | | |
|---|---|---|
| 2015/0186494 A1* | 7/2015 | Gilad .................... H04L 51/22 |
| | | 707/740 |
| 2015/0207880 A1 | 7/2015 | Jin et al. |
| 2015/0212889 A1 | 7/2015 | Amarendran et al. |
| 2016/0043982 A1 | 2/2016 | Perlow et al. |
| 2016/0043983 A1 | 2/2016 | Bishop et al. |
| 2016/0134693 A1 | 5/2016 | Li |
| 2016/0205054 A1 | 7/2016 | Lu et al. |
| 2016/0294971 A1 | 10/2016 | Li et al. |
| 2018/0018652 A1* | 1/2018 | Flores .................... G06Q 20/20 |

* cited by examiner

*640*

```
Receive a messaging client update request at a messaging
system from a messaging client on a client device.
642
```

```
Retrieve a message metadata set from a metadata store of the
messaging system, the message metadata set associated with a
metadata set most-recent sequence identifier for the message
metadata set.
644
```

```
Retrieve a message body set from a message store of the
messaging system, wherein retrieving the message body set
from the message store comprises providing the metadata set
most-recent sequence identifier for the message metadata set
to the message store, wherein the message store is operative
to self-update with a message queue to at least the metadata
set most-recent sequence identifier where a message store
most-recent sequence identifier is less than the metadata set
most-recent sequence identifier.
646
```

```
Provide the message metadata set and the message body set to
the messaging client on the client device.
648
```

Receive a messaging client update request from a client device at a message cache for a messaging system.
*662*

Retrieve a message set from a message storage system in response to the messaging client update request.
*664*

Determine that the message set is an out-of-date message set.
*666*

Retrieve a recent message update set from a message queue, the recent message update set comprising a plurality of message updates.
*668*

Apply the plurality of message updates to the out-of-date message set to generate an up-to-date message set.
*670*

Provide the up-to-date message set to the client device.
*672*

*FIG. 6D*

TECHNIQUES FOR EXTENSIBLE MESSAGE INDEXING

BACKGROUND

Users may interact with each other in a messaging system, sending messages back and forth to each other in a text-based conversation between two or more users. A user may have a user account associated with them in the messaging system. The user account is an online identity for the user and can be used as a destination for messages directed to the user, and generally for coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for message system operation. Some embodiments are particularly directed to techniques for extensible message indexing, consistent reads and consistent writes in a split message store, and data reads from secondary stores.

In one embodiment, an apparatus may comprise a client front-end component of a messaging system operative to receive an incoming message from a client device; identify a sending client service for the incoming message at the client front-end component; determine a service identifier index value for the sending client service at the client front-end component; and store the incoming message in a message queue using the service identifier index value.

In another embodiment, an apparatus may comprise a client front-end component of a messaging system operative to receive a message, the message comprising message metadata and a message body; and store the message in a message queue; and the message queue operative to initiate a storing of the message metadata in a metadata store; delay a storing of the message body in a message store until a metadata storage success indication is received from the metadata store; receive the metadata storage success indication from the metadata store; and store the message body in the message store in response to receiving the metadata storage success indication from the metadata store.

In another embodiment, an apparatus may comprise a client front-end component of a messaging system operative to receive a messaging client update request from a messaging client on a client device; and provide a message metadata set and a message body set to the messaging client on the client device in response to the messaging client update request; and a message cache component of the messaging system operative to retrieve the message metadata set from a metadata store of the messaging system, the message metadata set associated with a metadata set most-recent sequence identifier for the message metadata set; and retrieve the message body set from a message store of the messaging system, wherein retrieving the message body set from the message store comprises providing the metadata set most-recent sequence identifier for the message metadata set to the message store, wherein the message store is operative to self-update with a message queue to at least the metadata set most-recent sequence identifier where a message store most-recent sequence identifier is less than the metadata set most-recent sequence identifier.

In another embodiment, an apparatus may comprise a client front-end component of a messaging system operative to receive a messaging client update request from a client device; retrieve an up-to-date message set from a message cache component of the messaging system; and provide the up-to-date message set to the client device; and; the message cache component operative to retrieve a message set from a message store in response to the messaging client update request; determine that the message set is an out-of-date message set; retrieve a recent message update set from a message queue, the recent message update set comprising a plurality of message updates; and apply the plurality of message updates to the out-of-date message set to generate an up-to-date message set.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6C illustrates an embodiment of a third logic flow for the messaging system of FIG. 1.

FIG. 6D illustrates an embodiment of a fourth logic flow for the messaging system of FIG. 1.

DETAILED DESCRIPTION

Figure 1:
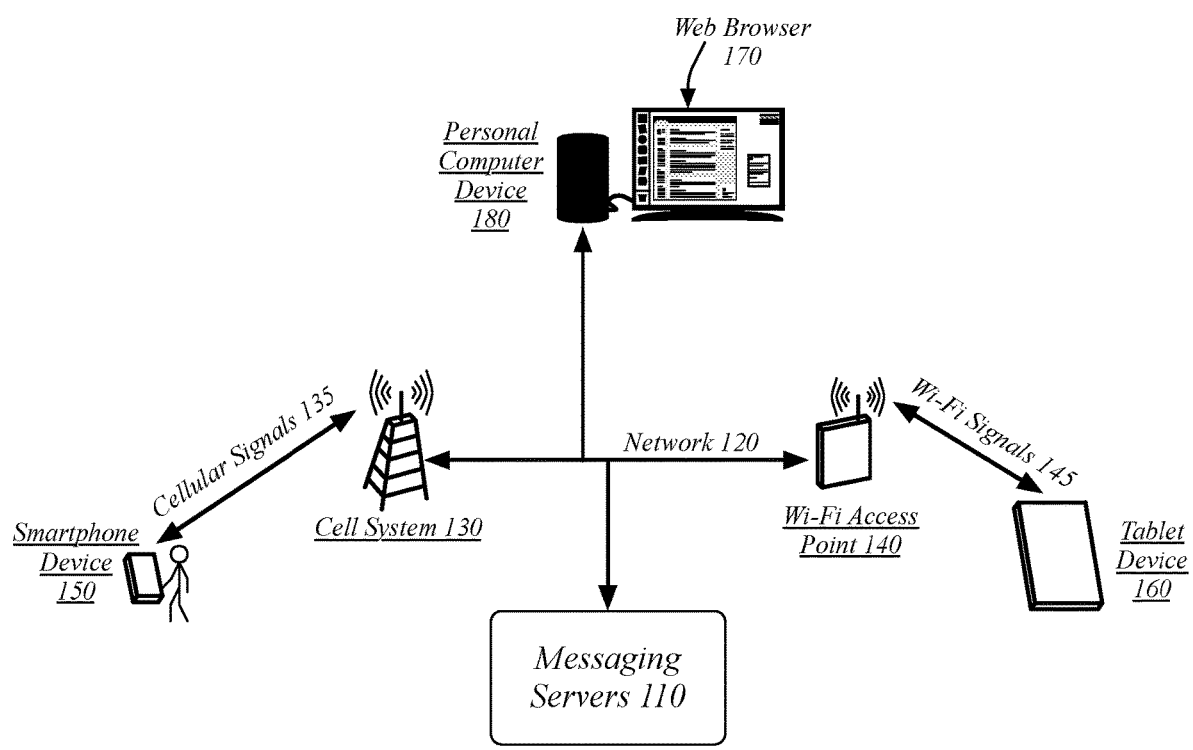
FIG. 1 illustrates an embodiment of a messaging system.

A messaging system receives, distributes, stores, retrieves, and generally processes messages. These operations use processing resources, network resources, storage resources, and generally computational resources. Improvements in the efficiency of these operations may therefore increase the responsiveness of the messaging system for its users, reduce the operating costs of the messaging system for its provider, and generally improve the operation of a messaging system.

For instance, a messaging system may have different types of message information retrieval operations that benefit from a particular message storage system. A first category of message information retrievals may use most or all of the message information for each retrieved message, such as a retrieval of a message body for display to a sender or recipient of that message. However, a second category of message information retrievals may use only a portion of the message information for each retrieved message, such as retrieving message metadata used to display a messaging inbox reflecting the state of various messaging conversations. As such, it may improve the operation of a messaging system to separate the storage of message metadata from message bodies. The message metadata may be stored in a higher-performance storage system than the message bodies, the use of higher-performance storage made practical by the reduced space used to store only message metadata rather than the full message bodies. This higher-performance storage system for the message metadata may improve the performance of frequent message metadata retrievals, while retrieval of full message bodies is served from a higher-capacity, but lower-performance storage system.

The performance of consistent writes to a split message store may involve the use of specific write techniques. These write techniques may be used to maintain consistency in the split message metadata and message body stores. Similarly, the performance of consistent reads to a split message store may involve the use of specific read techniques. These read techniques may be used to maintain consistency in the results retrieved from split message metadata and message body stores.

A messaging system may maintain an index of messages maintained by the messaging system. As the messaging system evolves, the services offered by the messaging system may change, with new services being added. Some of these services may make use of indexes of the messages to retrieve and search messages related to those services. However, adding a new index to a database may be a computationally expensive operation and may involve database engineers making fundamental adjustments to the database. As such, the messaging system may be improved by using a thread-type index on the message stores. The thread-type index may store index values that operate as indexes for multiple services, empowering those services to select the messages associated with them.

The messaging system may include a message cache, the message cache empowering faster retrieval of messages and message information. However, in some cases, a cache may be out-of-date at the time a message retrieval is performed. If the messages may not yet have been replicated to the cache, the cache may hold the response until it can get the messages from IRIS. If the messages are older than the cache stores, the cache may fetch older messages from a message store. However, where the message store does not have the most up-to-date messages, which particularly may happen when using a secondary store due to a primary store being down, the cache may need to update the message state received from the secondary message store by retrieving it from a message queue. This current state may then be then be cached to empower returning up-to-date results to the user.

These techniques, either by themselves or in combination, may improve the efficiency of a messaging system, increasing responsiveness, reducing operating costs, and generally improving the operation of the messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a messaging system 100. In one embodiment, the messaging system 100 may comprise a computer-implemented system having software applications comprising one or more components. Although the messaging system 100 shown in FIG. 1 has a limited number of elements in a certain topology, it may be appreciated that the messaging system 100 may include more or less elements in alternate topologies as desired for a given implementation.

Messaging servers 110 may comprise one or more messaging servers operated by a messaging platform as part of a messaging system 100. A messaging server may comprise an Internet-accessible server, with the network 120 connecting the various devices of the messaging system 100 comprising, at least in part, the Internet. A messaging system 100 may use the messaging servers 110 to support messaging for various user client devices.

A user may own and operate a smartphone device 150. The smartphone device 150 may comprise an iPhone® device, an Android® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system 100 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system 100 may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system 100 may be prevented from decrypting messages being sent between clients. In some embodiments, users can select whether a particular message thread uses end-to-end encryption (and thereby receive the additional privacy of the messaging servers being prevented from accessing the contents of messages) or doesn't (and thereby receive the benefit of the messaging system 100 being able to programmatically access messages for the purpose of offering relevant services to the users).

The messaging system 100 may use knowledge generated from interactions between users. The messaging system 100 may comprise a component of a social-networking system and may use knowledge generated from the broader interactions of the social-networking system. As such, to protect the privacy of the users of the messaging system 100 and the larger social-networking system, messaging system 100 may include an authorization server (or other suitable component (s)) that allows users to opt in to or opt out of having their actions logged by the messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 100 and other elements of a social-networking system through blocking, data hashing, anonymization, or other suitable techniques as appropriate.

Expandable Message Indexing

Figure 2:
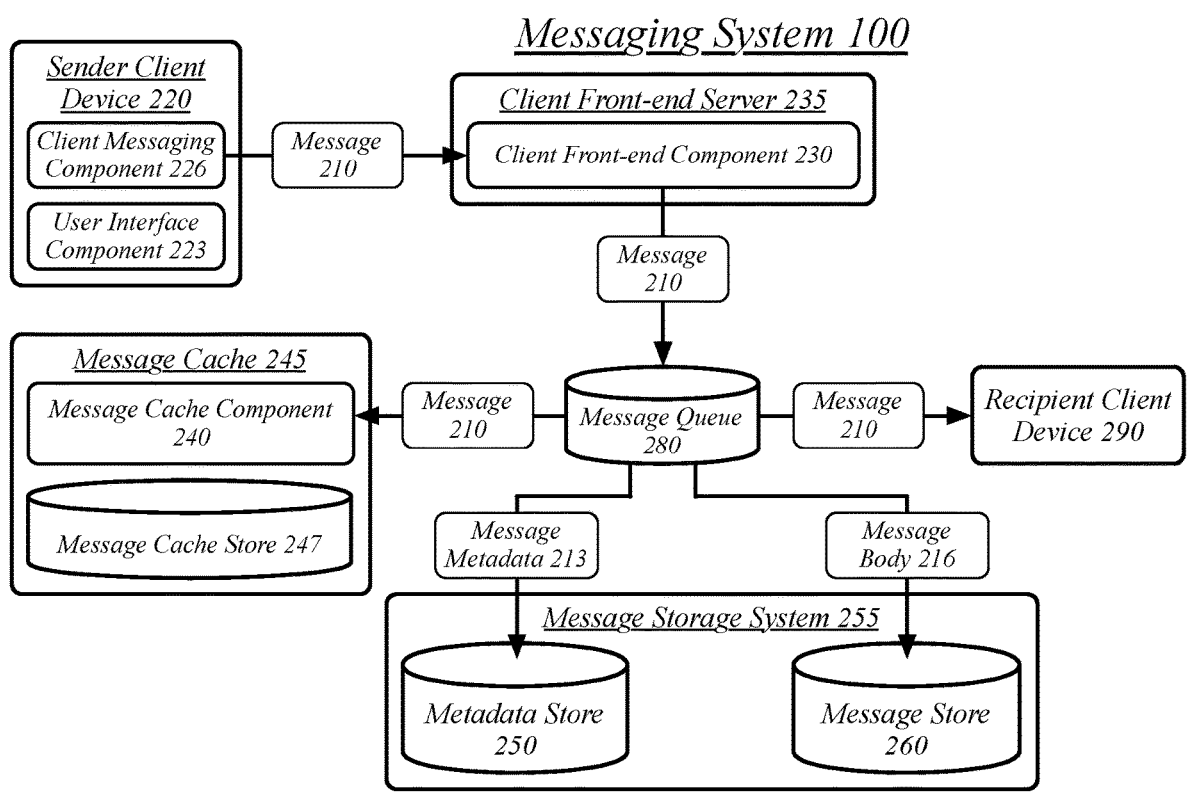
FIG. 2 illustrates an embodiment of a messaging system receiving, distributing, and storing an incoming message.

FIG. 2 illustrates an embodiment of a messaging system 100 receiving, distributing, and storing an incoming message.

A messaging system 100 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 235 may be interpreted as using the network interface controller for network access to a communications network for the transmission or reception of information.

A messaging client may comprise a user interface component 223. A user interface component 223 may be generally arranged to display user interfaces to a user of a client device and to receive user commands for the messaging client for the client device. A messaging client may comprise a client messaging component 226. A client messaging component 226 may be generally arranged to conduct messaging interactions on the behalf of the messaging client via communication with the client front-end server 235.

A client front-end server 235 may be generally arranged to act as a network access point to the messaging system 100 for client devices such as sender client device 220. The client front-end server 235 may comprise a client front-end component 230, the client front-end component 230 generally arranged to act as a network access point to messaging services for the messaging system 100. The client front-end component 230 may receive messages from client devices and add the messages to message queues.

A message queue 280 may be specifically associated with the user of sender client device 220, such as by being uniquely associated within the messaging system 100 with a user account for the user of sender client device 220. The message queue 280 may be a single queue used for all messaging endpoints used by this user. The message queue 280 may comprise a representation of updates in a strict linear order. The message queue 280 may be organized as a data unit according to a variety of techniques. The message queue 280 may be stored in semi-persistent memory, persistent storage, both semi-persistent memory and persistent storage, or a combination of the two. The message queue 280 may be organized according to a variety of data structures, including linked lists, arrays, and other techniques for organizing queues. The message queue 280 may generally comprise a first-in-first-out (FIFO) queue in which no update will be removed or retrieved from the queue before any updates that were received prior to it.

A messaging conversation is exchanged via a messaging system 100. This messaging conversation involves at least one client device, such as a sender client device 220 and/or a recipient client device 290. A message 210 may be sent from a client messaging component 226 of a messaging client on a sender client device 220. This message 210 is associated with a message thread, the message thread involving two or more participants, including the user of the sender client device 220. This message 210 comprises a portion of the messaging conversation carried out within a message thread.

The message 210 is received by the client front-end component 230 of the client front-end server 235 and is added to a message queue 280 associated with the sender. The message 210 is distributed using the message queue 280 to the recipient client device 290. The message 210 may also be redistributed back to the sender client device 220 for association with the message conversation and message thread. The message queue 280 may, for instance, assign a message identifier to the message 210 for identifying the message 210 within the messaging system 100. The message 210 may be sent to the sender client device 220 in association with the message identifier for storage and display on the sender client device 220.

The messaging system 100 may comprise a message cache 245. The message cache 245 comprises a high-speed storage system, such as may be higher-speed than used for a metadata store 250 or message store 260. The message cache 245 is generally arranged to store recent messages for users of the messaging system 100 so as to empower high-speed retrieval of recent messages, which may correspond to the most frequently-requested messages for that user and therefore the messages for which the most benefit is received from making available on high-speed storage. The message cache 245 comprises a message cache component 240 and message cache store 247. The message cache component 240 is operative to interoperate with other components of the messaging system 100 for the storage and retrieval of messages. The message cache store 247 is operative to store the messages for use in message cache operations. The message 210 may be distributed to a message cache 245 by the message queue 280, where the message 210 is cached according to message cache retention policies defining which messages are retained for how long a period of time.

The messaging system 100 may comprise a message storage system 255. The message storage system 255 is generally arranged to store the message history for the messaging system 100. The message storage system 255 may store messages exchanged via the messaging system 100.

In some embodiments, the message storage system 255 may be a unified message store for a messaging system 100 with a unified message storage architecture. The message storage system 255 may comprise a message store 260 that stores the complete contents of messages, including a message body and any message metadata associated with the message.

Alternatively, the messaging system 100 may use a message storage system 255 with a split message storage architecture with both a metadata store 250 and message store 260. In these embodiments, the metadata store 250 stores message metadata without the message bodies, with the message bodies instead stored in the message store 260. The message store 260 stores message bodies without the associated message metadata.

The metadata store 250 may be located on a first storage device system, the message store 260 located on a second storage device system, the first storage device system distinct from the second storage device system. The first storage device system may comprise a higher-speed storage device system than the second storage device system, so as to empower higher-speed performance of frequent message metadata lookup tasks while the lower-speed storage system has higher capacity for the storage of the larger message bodies as compared to the message metadata. The first storage device system and the second storage device system may each comprise one of a centralized single-device storage device system or a decentralized multiple-device storage device system.

The message 210 is stored in the message storage system 255 to empower the retrieval and search of the message 210 as part of the body of messages stored by the message storage system 255. Where a split message storage system 255 is used, the message queue 280 stores the message metadata 213 in the metadata store 250 and stores the message body 216 in the message store 260.

A sender client device 220 may generate a message 210 and send the message 210 to the client front-end component 230. The messaging system 100 receives the incoming message 210 from the sender client device 220 at the client front-end component 230 for the messaging system 100.

Messages may be associated with a particular service offered by the messaging system 100. As such, a particular message 210 may be associated with a sending client service operating on the sending client device 220. For example, the messaging system 100 may offer a messaging-based commerce service in which commerce transactions can be arranged and performed through the exchange of users of the messaging system 100. In some cases, the sending client service may comprise the messaging-based commerce service. Other services may be used, such as an user-profile-linked ephemeral image service. A user-profile-linked ephemeral image service associates various ephemeral (i.e., temporary and expiring) images, selected by a user, with the user's profile on a temporary, expiring basis. Other services may be provided to a sender client device 220.

The client front-end component 230 identifies the sending client service for the incoming message 210. For instance, the message 210 may be flagged with an identifier for the service by the client messaging component 226 based on the service in the messaging client generating the message 210. The client front-end component 230 receives the message 210 from the sender client device 220, determines a service identifier index value for the sending client service by matching the service to the service identifier index value and stores the incoming message 210 in a message queue 280 using the service identifier index value.

The messaging system 100 may use a messaging index system based on a plurality of indices. The messaging system 100 may specifically use three indices: a read status, a message folder, and a thread type. A read status comprises an index on the messages stored by the messaging system 100 indicating for each message whether or not it has been read by its recipient. The read status empowers the selection of messages based on whether or not they have been read by their recipients. The message folder comprises a sorting of messages into particular locations that they are presented within a messaging client. For instance, a default or typical location for messages in a messaging client may be in a messaging inbox. However, for an ephemeral image service associated with a user profile, the messages (comprising ephemeral images) may be displayed in association with a user profile rather than organized into the inbox. As such, a message folder may be assigned as an ephemeral image service index value. The thread type comprises a designation of a particular type of thread, such as identifying a particular service.

The client front-end component 230 may therefore store the incoming message 210 in a message queue 280 using a plurality of indices, the plurality of indices comprising at least a read status, a message folder, and a thread type. The client front-end component 230 may store the incoming message 210 in a message queue 280 using specifically these three indices. The service identifier index value is assigned as the thread type in these embodiments.

A benefit of using a general index scheme to support messaging system services is that additional services can be added without adding an additional index to the message storage system 225. Instead, an additional service can be supported by supporting an additional index value. The client front-end component 230 can be configured for an additional client service based on adding an additional service identifier index value that is associated with the additional client service, such that an incoming message 210 associated with the additional client service is assigned the additional service identifier index value where it associated with the additional service.

Messaging system services receive messages associated with them via the message queue 280. The message queue 280 is operative to deliver the incoming message 210 to a subscribing service based on the subscribing service being associated with the service identifier index value assigned to the message 210 by the client front-end component 230. For example, an incoming message 210 may be an assignment of an image to a user-profile-linked ephemeral image service. The client front-end component 230 assigns an ephemeral image service index value as the message folder prior to sending the incoming message 210 in the message queue 280. The incoming message 210 is delivered to the user-profile-linked ephemeral image service via the message queue 280 and thereby assigned to the user's profile. This process may be used, without limitation, for other messaging system services.

The message queue 280 also delivers the message 210 to the message storage system 225. The message queue 280 stores the incoming message 210 in a message store 260 using the service identifier index value as a thread type for a thread type index of the message store 260.

The client front-end component 230 may comprise a component that is easier to modify than other components of the messaging system 100. For instance, the message storage system 255 may comprise a database system in which adding additional indices is computationally expensive and involves significant developer investment using senior developers as it may involve rebuilding one or more databases. In contrast, modifying the client front-end component 230 to add an additional service identifier index value may be performed by less-senior developers and use less computational resources as it may involve modifying only the code running on the client front-end component 230. In some embodiments, the client front-end component 230 may execute a scripting language for processing incoming messages. For instance, the client front-end component 230 may execute the PHP: Hypertext Preprocessor scripting language.

The sender client device 220 may also perform a message retrieval request, the message retrieval request a request to retrieve one or more messages. The message retrieval request may comprise one or more retrieval parameters identifying what messages should be retrieved. Retrieval parameters may indicate that a general inbox retrieval should be performed, wherein a predefined number of recent threads should be retrieved (e.g., the twenty threads that have most recently had messages sent or received in them) and a predefined number of recent messages in each of the recent threads (e.g., the twenty most recent messages in each of the most recent threads). A message retrieval request may specify one or more of the indices of the messaging system 100, such as one or more of a read status, a message folder, and a thread type. In some embodiments, the message retrieval request may be automatically performed by the client messaging component 226 in response to the message 210 being sent so as to retrieve the message 210 from the messaging system 100 with the one or more assigned index values.

The client front-end component 230 may receive a message retrieval request from the sender client device 220, the message retrieval request identifying the service identifier index value as the thread type for the thread type index of the retrieval parameters of the message retrieval request. The client front-end component 230 retrieves a plurality of messages based on using the service identifier index value with the thread type index. Retrieval the plurality of messages may comprise performing a retrieval with the message storage system 255. The client front-end server 235 receives the plurality of messages from the message storage system 255 and returns the plurality of messages to the sender client device 220 in response to the message retrieval request. For example, the service identifier index value may correspond to a messaging-based commerce service, with the message retrieval request corresponding to a commerce message thread view on the sender client device 220, the message retrieval request thereby retrieving the message 210 sent to a commerce message thread being viewed on the user interface component 223 as a commerce message thread view.

Consistent Writes with Split Stores

Figure 3:
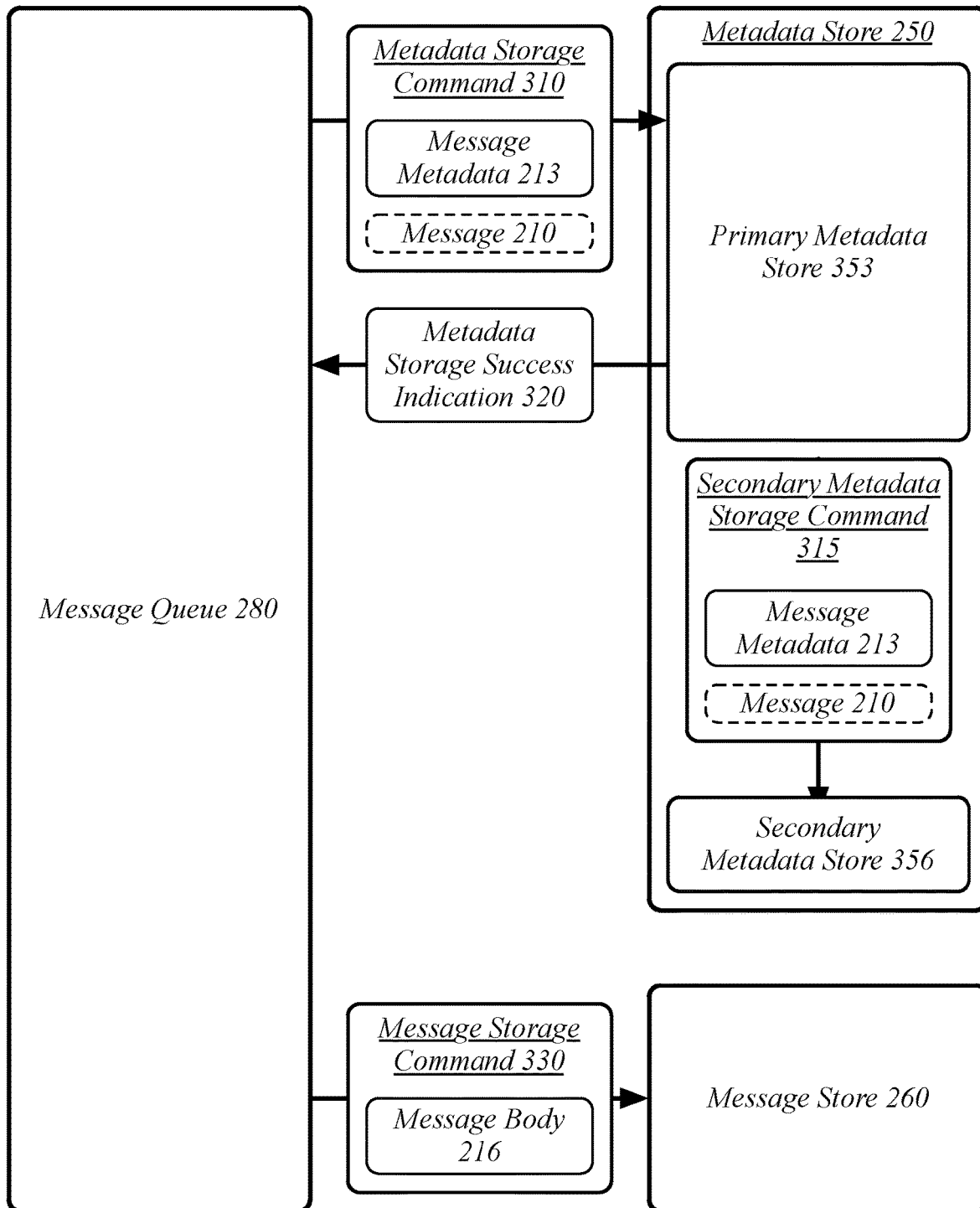
FIG. 3 illustrates an embodiment of a messaging system storing a message in a split message store.

FIG. 3 illustrates an embodiment of a messaging system 100 storing a message in a split message store comprising a metadata store 250 and message store 260.

Once a client front-end component 230 of a messaging system 100 receives a message 210, it stores the message 210 in a message queue 280. The message 210 comprises message metadata 213 and a message body 216.

The message queue 280 is operative to initiate a storing of the message metadata 213 in a metadata store 250 using a metadata storage command 310. The metadata storage command 310 instructs the metadata store 250 to store message metadata 213 encapsulated in the metadata storage command 310. The metadata storage command 310 may be sent from the message queue 280 to the metadata store 250 over an internal network of the messaging system 100 and/or over the Internet.

Once the message metadata 213 has been successfully stored in the metadata store 250, the metadata store 250 sends a metadata storage success indication 320 to the message queue 280. The metadata storage success indication 320 indicates successful storage of the message metadata 213 to the metadata store 250. The message queue 280 then receives the metadata storage success indication 320 from the metadata store 250.

The message queue 280 stores the message body 216 in the message store 260 using a message storage command 330. The message body 216 comprises just a non-metadata, body portion of the message 210.

However, in order to maintain consistency, the messaging system 100 may maintain an order in which a message 210 is stored to various components of the messaging system 100. Specifically, the message queue 280 may be provided with each message 210 before either the metadata store 250 or message store 260, while the metadata store 260 is provided with each message 210 before the message store 260. The ordering of the message queue 280 coming before the metadata store 250 and the message store 260 may be maintained by using the message queue 280 to store the message 210 in the metadata store 250 and message store 260.

The ordering of the metadata store 250 receiving its portion of the message 210 prior to the message 210 being stored in the message store 260 may be maintained by the message queue 280. The message queue 280 delays the storing of the message body 216 in the message store 260 until the metadata storage success indication 320 is received from the metadata store 250. The message queue 280 stores the message body 216 in the message store 260 in response to receiving the metadata storage success indication from the metadata store. The message queue 280 thereby guarantees that the metadata store 250 is always ahead or at pace with the message store 260 and never behind the message store 260.

The metadata store 250 may comprise a replicated metadata store 250 in which multiple copies of stored data are replicated across distinct storage systems to provide redundancy. The metadata store 250 may comprise a primary metadata store 252 and a secondary metadata store 256. In some embodiments, the metadata store 250 may comprise a plurality of secondary metadata stores, each replicating the primary metadata store 353. The primary metadata store 353 may replicate each received message metadata 213 to the one or more secondary metadata stores using a secondary metadata storage command 315 or a plurality of secondary metadata storage commands, wherein a secondary metadata storage command 315 instructs a secondary metadata store 356 to store message metadata 213. In some embodiments, the message store 260 may comprise a replicated message store 260 that comprises a primary message store and one or more secondary message stores.

The metadata storage success indication 320 indicates successful storage in the primary metadata store 353. However, in some embodiments, the metadata storage success indication 320 may additionally indicate successful replication to one or more secondary metadata stores. As such, the message queue 280 may store the message body 216 in the message store 260 in response to receiving the metadata storage success indication 320 from a secondary metadata store.

Alternatively, the metadata storage success indication 320 may indicate only successful storage in the primary metadata store 353, with successful replication being indicated by a distinct metadata replicated storage success indication. As such, the message queue 280 may delay storing the message body 216 in the message store 260 until the metadata storage success indication is received and a metadata replicated storage success indication is received, receive the metadata replicated storage success indication from a secondary metadata store 356 to indicate successful replication, and store the message body 216 in the message store 260 in response to receiving the metadata storage success indication 320 and the metadata replicated storage success indication. The metadata replicated storage success indication indicates successful replication of the message metadata 213 to one or more secondary metadata stores.

A message may be received as a message mutation. A message mutation represents an atomic change to the message state of a messaging client. A message mutation may comprise an addition, deletion, or modification of the messages associated with a message thread, messaging conversation, user account, or other representation of messaging state. A message mutation may comprise one of four possible operations: an added message, a message deletion, a timestamp-based batch message deletion, or an end-state-based message amendment. An added message comprises a mutation that adds a message to user's store of messages. A message deletion comprises a mutation that removes a message from a user's store of messages. A timestamp-based batch message deletion deletes one or more messages by identifying a timestamp wherein all messages with that timestamp or older is deleted. An end-state-based message amendment comprises a modification to a message that completely describes the end state—the state of the message after the modification—rather than describing only the changes to the message.

In some embodiments, the message 210 may be stored as the message mutation in the metadata store 250 in association with the message metadata as a temporary cache of the message mutation. The metadata store 250 won't store the message body 216 for all messages that it stores, as that is the domain of the message store 260, but rather keep a temporary cache of recent message mutations. This cache of recent message mutations may be used to retrieve the message mutation for recent messages where, for instance, a message store 260 is unavailable, such as due to the message store 260 being down.

Consistent Reads with Split Stores

Figure 4:
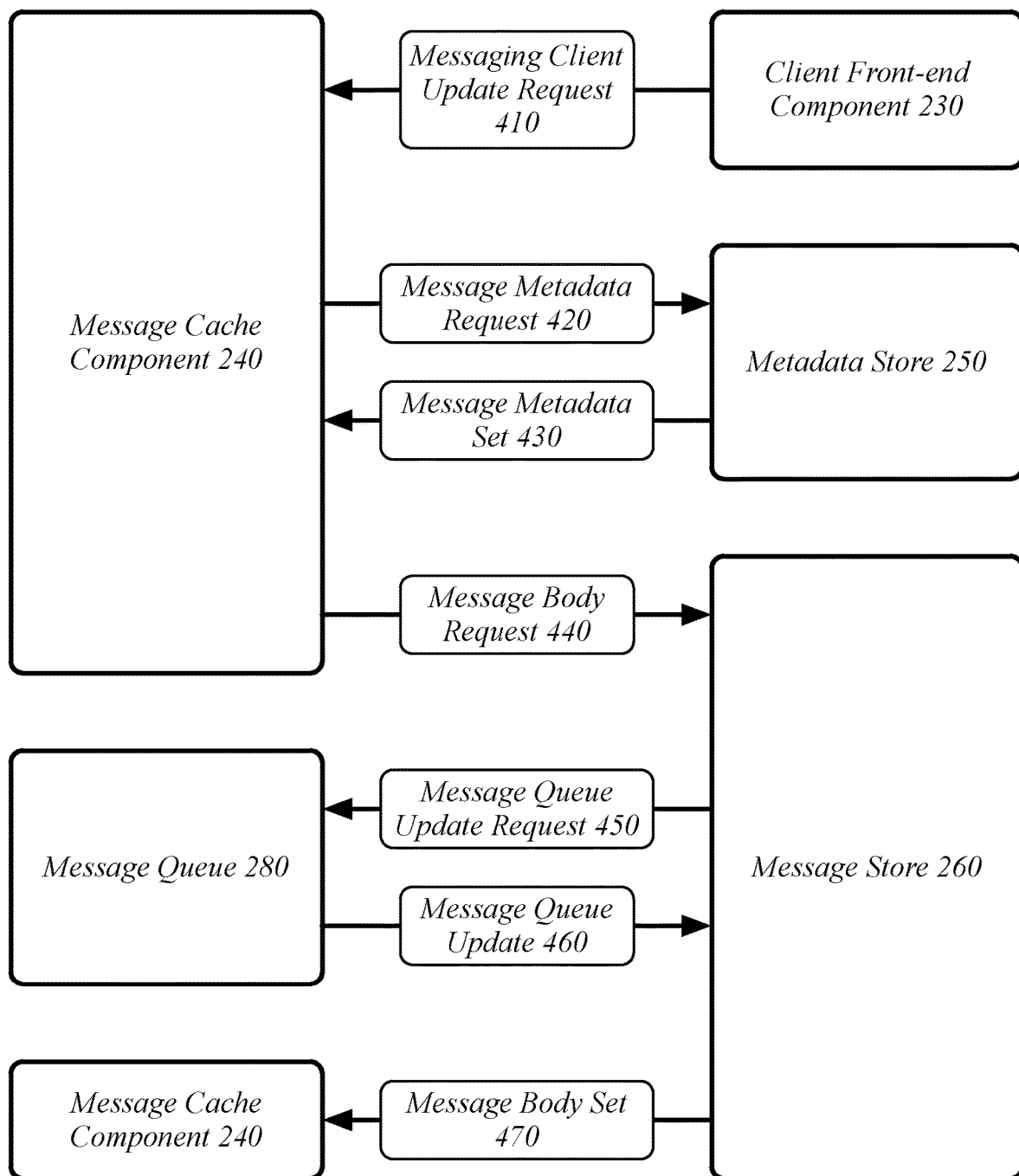
FIG. 4 illustrates an embodiment of a messaging system retrieving a message body set from a split message store.

FIG. 4 illustrates an embodiment of a messaging system 100 retrieving a message body set 470 from a split message store.

The client front-end component 230 of a messaging system 100 may receive a messaging client update request 410 from a messaging client on a client device 405. The client device 405 also executes a messaging client comprising a client messaging component 226 and user interface component 223. In some cases, the client device 405 may comprise a sending client device 220 performing a message retrieval after sending a message 210 so as to update a messaging state for the messaging client to its state after the message 210 has been sent. The messaging client update request 410 may correspond to an automatic periodic update of the messaging client, may correspond to a messaging inbox view, may correspond to a message thread view, or to any other situation prompting the update of a messaging client.

The client front-end component 230 performs the messaging client update request 410 using a message cache component 240. The message cache component 240 is used as an intermediary for messaging client update requests so that if all of a messaging client update request 410 can be performed out of a message cache store 247, then the messaging client update request 410 can be performed without using the computational resources of the message storage system 255 and at a higher speed than if the message storage system 255 were used. If even some of the messaging client update request 410 can be performed out of a message cache store 247 than, while the message storage system 255 may still be used, the extent of that usage may be lower than if the message storage system 255 were used for the entire messaging client update request 410 and therefore the messaging client update request 410 may be performed with less use of the resources of the message storage system 255. The illustrated embodiment of FIG. 4 may represent a case in which the message cache component 240 performs retrievals from the metadata store 250 and message store 260 due to it not having some or all of the messages that satisfy the messaging client update request 410. It will be appreciated that in alternative embodiments, however, the client front-end component 230 may directly perform the message retrieval without the use of a message cache component 240, with the retrieval operations of the message cache component 240 performed by the client front-end component 230.

The message cache component 240 performs a message metadata request 420 in response to the messaging client update request 410 from the client front-end component 240. The message metadata request 420 is a retrieval of a message metadata set 430 from the metadata store 250. As the messaging client update request 140 may comprise one or more parameters defining the requested messages, the message metadata request 420 may also comprise these one or more parameters to configure the retrieval from the metadata store 250.

The message cache component 240 retrieves a message metadata set 430 from a metadata store of the messaging system by sending a message metadata request 420 to the metadata store 250, the message metadata request 420 indicating the parameters of the messaging client update request 410. The metadata store 250 sends the message metadata set 430 to the message cache component 240 in response to the message metadata request 420. The message metadata set 430 is associated with a metadata set most-recent sequence identifier for the message metadata set, the most-recent sequence identifier identifying what the most recent sequence identifier is for the messages represented in the message metadata set 430. The sequence identifiers of the message place an ordering on the messages of the messaging system 100, and may include a timestamp for each of the message.

The message cache component 240 retrieves a message body set 470 from the message store 260. The message cache component 240 provides the metadata set most-recent sequence identifier for the message metadata set 430 to the message store 260. The message store 260 is operative to self-update with the message queue 280 to at least the metadata set most-recent sequence identifier where a message store most-recent sequence identifier is less than the metadata set most-recent sequence identifier.

The message store most-recent sequence identifier is the highest value and therefore chronologically most-advanced sequence identifier stored in the message store 260. Where the message store most-recent sequence identifier is equal to the metadata set most-recent sequence identifier, the message store 260 is sufficiently up-to-date to respond to the message body request 440 based on the messages already stored in the message store 260. However, in some cases, the message store 260 may be behind the metadata store 250 in the messages it has stored. This may occur, without limitation, because of the write ordering placed on the metadata store 250 and message store 260 in which the metadata store 250 is written-to before the message store 260.

The message store 260 compares the message store most-recent sequence identifier to the metadata set most-recent sequence identifier to determine whether request additional updates from the message queue 280 before generating the message body set 470. Where the metadata set most-recent sequence identifier is no greater than (is less than or equal to) the message store most-recent sequence identifier, the message store 260 is sufficiently up-to-date to produce a message body set 470 with message bodies corresponding to all of the messages with metadata in the message metadata set 430. As such, the message body set 470 is generated from the message store 260 without a retrieval from the message queue 280 where the metadata set most-recent sequence identifier is no greater than the metadata set most-recent sequence identifier.

In the alternative case, where the metadata set most-recent sequence identifier is greater than the message store most-recent sequence identifier, the message store 260 lacks at least some of the message bodies that match the message metadata in the message metadata set 430. As such, in response to determining that the metadata set most-recent sequence identifier is greater than the message store most-recent sequence identifier, the message store 260 sends a message queue update request 450 to the message queue 280 to retrieve the message bodies that are missing in the message store 260 relative to the message metadata set 430 based on the metadata set most-recent sequence identifier.

The message queue update request 450 is sent from the message store 260 to the message queue 280. The message queue update request 450 may comprise the metadata set most-recent sequence identifier, the inclusion of the metadata set most-recent sequence identifier in the message queue update request 450 to instruct the message queue 280 of the extent to which it should bring the message store 260 up to date to allow the message store 260 to satisfy the message body request 440.

The message queue 280 maintains a current sequence number for each subscriber to the message queue 280. The message queue 280 progresses the current sequence number for a subscriber by delivering messages to that subscriber to which that subscriber is subscribed. The message store 260 and metadata store 250 each may be subscribed to all messages for the messaging system 100, with the message queue 280 operative to delivery message metadata to the metadata store 250 and message bodies to the message store 260. The current sequence number in the message queue 280 for the message store 260 is equal to the message store most-recent sequence identifier. The message queue update request 450 instructs the message queue 280 to advance the current sequence number for the message store 260 to at least the metadata set most-recent sequence identifier by delivering all messages to which the message store 260 is subscribed up to at least the metadata set most-recent sequence identifier via a message queue update 460 or a plurality of message queue updates.

Once the message store 260 is sufficiently up-to-date that the message store most-recent sequence identifier is at least equal to (equal to or greater) metadata set most-recent sequence identifier, it has sufficient message bodies to respond to the message body request 440. It therefore collects the message bodies corresponding to the message body request 440—and therefore corresponding to the message metadata set 430—and provides them to the message cache component 240 in a message body set 470.

In some cases, the message store 260 may, at the time of the message body request 440, be in advance of the metadata store 250 at the time of the message metadata set 430 is generated. While the metadata store 250 may be kept in advance of the message store 260, the elapsing of time at the message cache component 240 between the return of the message metadata set 430 and the performance of the message body request 440 may allow additional messages that satisfy the parameters of the message client update request 410 to be received at the message store 260.

In some embodiments, handling this situation falls on the client device. Where the responsibility falls on the client device, the messaging client on the client device is operative to ignore one or more messages that are represented in the message body set 470 but not represented in the message metadata set 430. The messaging client may be generally operative to only act on complete messages that it receives, ignoring any messages for which it has only a message body without the associated message metadata.

In other embodiments, handling this situation falls on the message store 260. Where the responsibility falls on the message store 260, the message store 260 is operative to provide the message body set 470 at a messaging recency based on the metadata set most-recent sequence identifier. The message store 260 collects the message bodies corresponding to the parameters of the message body request 440—and therefore corresponding to the parameters used to generate the message metadata set 430—but exclusively those that have sequence numbers that do not exceed the metadata set most-recent sequence identifier, and provides them to the message cache component 240 in a message body set 470.

The client front-end component 230 of the messaging system 100 receives the message metadata set 430 and the message body set 470 and provides the message metadata set 430 and the message body set 470 to the messaging client on the client device in response to the messaging client update request 410. In some embodiments, the message cache component 240 or the client front-end component 230 may combine the message metadata set and message body set into a message set prior to the messages being provided to the client device. The client front-end component 230 provides the message metadata set 430 and message body set 470 to the messaging client on the client device as the combined message set. The message metadata set 430 and the message body set 470 correspond to a plurality of messages, wherein each of the plurality of the messages may comprise one of an added message, a message deletion, a timestamp-based batch message deletion, and an end-state-based message amendment.

The client front-end component may provide the message metadata set 430 and message body set 470 to the messaging client on the client device with a messaging client update request sequence identifier set to the metadata set most-recent sequence identifier. This may inform the messaging client as to the most-recent sequence identifier for a message represented in both the message metadata set 430 and the message body set 470. This may aid the messaging client in ignoring any message elements, such as message bodies, in advance of the metadata set most-recent sequence identifier.

Data Reads From Secondary Stores

Figure 5:
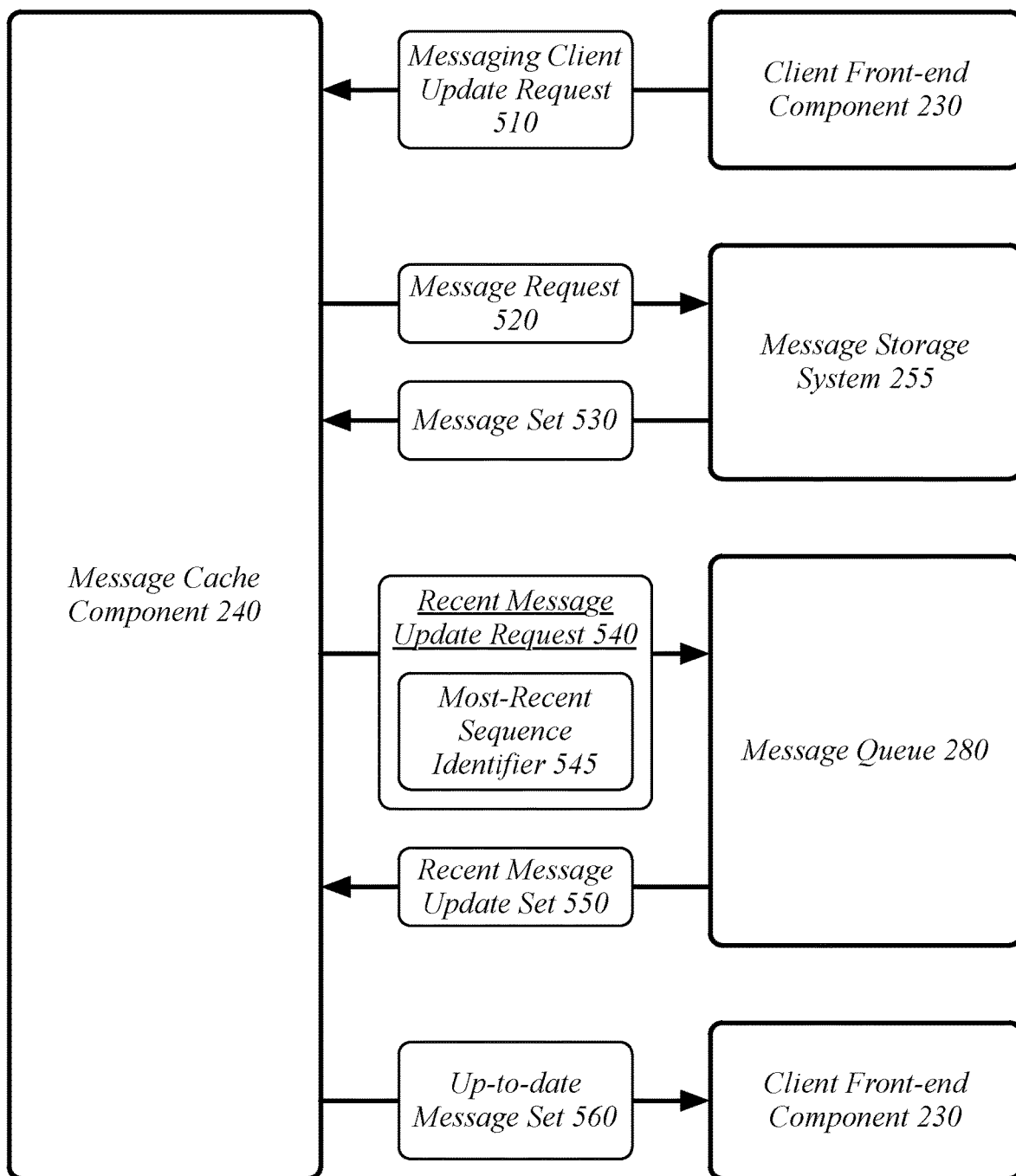
FIG. 5 illustrates an embodiment of a messaging system performing a data read from a secondary message store.

FIG. 5 illustrates an embodiment of a messaging system 100 performing a data read from a secondary message store 460.

The client front-end component 230 receives a messaging client update request 510 from a client device and retrieves an up-to-date message set 560 from a message cache component 240 in response. The client front-end component 230 then provides the up-to-date message set 560 to the client device.

The message cache component 240 retrieves a message set 530 from the message storage system 255 in response to the messaging client update request 510. The message set 530 may correspond to a message metadata set 430 and message body set 470 where a split message storage system 255 is used. However, the message cache component 240 may determine that the message set 530 is an out-of-date message set 530.

Determining that the message set 530 is an out-of-date message set 530 may use a variety of techniques. In one embodiments, determining that the message set 530 is an out-of-date message set 530 may comprise comparing the most-recent sequence identifier 545 for the message set 530 to one for the message queue 280 and determining that the message set 530 is behind the message queue 280.

In another embodiment, the message cache component 240 may be determined based on the retrieval of the message set 530 being from a secondary replicated message store of the message storage system 255. The message storage system 255 may comprise a primary replicated message store and one or more secondary replicated message stores, wherein the secondary replicated message stores replicate the primary replicated message store to provide redundancy to the message storage system 255. Where a split message storage system 255 is used, one or both of the metadata store 250 and the message store 250 may be replicated across multiple devices to provide redundancy.

In some cases, the message cache component 240 may select the secondary replicated message store for retrieving the message set 530 based on the primary replicated message store being unavailable. For instance, the primary replicated message store may be down due to computer failure, network failure, or other failure. The message cache component 240 may receive notification that the primary replicated message store is down, either before attempting a message request 520 or after a message request 520 to the primary replicated message store fails due to it being down. In these cases, the secondary replicated message store may be out-of-date due to the primary replicated message store being down and therefore not performing replication.

In other cases, the message cache component 240 may select the secondary replicated message store for retrieving the message set based on the secondary replicated message store offering higher performance to the message cache component 240 than the primary replicated message store. For instance, the message cache component 240 may select the secondary replicated message store for retrieving the message set based on the secondary replicated message store being more geographically proximate to the message cache component 240 than the primary replicated message store. In these cases, the secondary replicated message store may be out-of-date due to lag in replication from the primary replicated message store to secondary replicated message stores.

As such, the message set 530 may be retrieved from the secondary replicated message store by the message cache component 240, with the message request 520 sent to the secondary replicated message store by the message cache component 240. The secondary replicated message store may return an out-of-date message set 530 based on the secondary replicated message store being behind a primary replicated message store. The message cache component 240 may thereafter update the out-of-date message set 530 to produce an up-to-date message set 560 using a recent message update set 550 retrieved from the message queue 280. The recent message update set 550 comprises a plurality of message updates, the message updates comprising messages stored in the message queue 280 that are more recent than those in the out-of-date message set 530. The message cache component 240 then applies the plurality of message updates to the out-of-date message set 530 to generate an up-to-date message set 560.

The message cache component 240 may retrieve the recent message update set 550 from the message queue 280 based on a most-recent sequence identifier 545 for the out-of-date message set 530. The message cache component 240 sends a recent message update request 540 to the message queue 280, the recent message update request 540 comprising the message set most-recent sequence identifier 545. The out-of-date message set 530 may be associated with a most-recent sequence identifier 545 that identifies the most-recent (i.e., chronologically most advanced) sequence identifier of any message in the out-of-date message set 530. The message queue 280 identifies one or more message updates, which may include a plurality of message updates, that are more recent than the message set most-recent sequence 545 identifier. The message queue 280 then provides the recent message update set 550 to the message cache component 240.

Because the message queue 280 may not be configured to handle a parameter-based message request, in which only the messages relevant to the messaging client update request 510 are retrieved, the message queue 280 may instead provide the message cache component 240 with the entire span of messages that the message cache component 240 is missing, starting with the most-recent sequence identifier 545 and ending with the oldest message that the message cache 245 has maintained in its message cache store 247. As such, the message cache component 240 may provide both the messaging set most-recent sequence identifier 545 and a message cache oldest sequence identifier to the message queue 280. The message cache oldest sequence identifier identifies the sequence identifier of the oldest message in the message cache store 247. As the message cache store 247 maintains a continuous collection of messages, the message cache 245 may be brought to a sufficient state to respond to the messaging client update request 510. The message queue 280 is operative to retain messages until the messages are stored in the message storage system 255. The message queue 280 may specifically be operative to retain messages until the messages are replicated through the message storage system 255, such that any message can be retrieved from the primary store and all of the secondary stores of the message storage system 255.

The message cache component 240 may cache the up-to-date message set in the message cache 245, such as in the message cache store 247 of the message cache 245. The message cache component 240 may specifically cache the up-to-date message set 560 in the message cache 245 based on a message cache retention time that is less than a message queue retention time for the message queue.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6A:
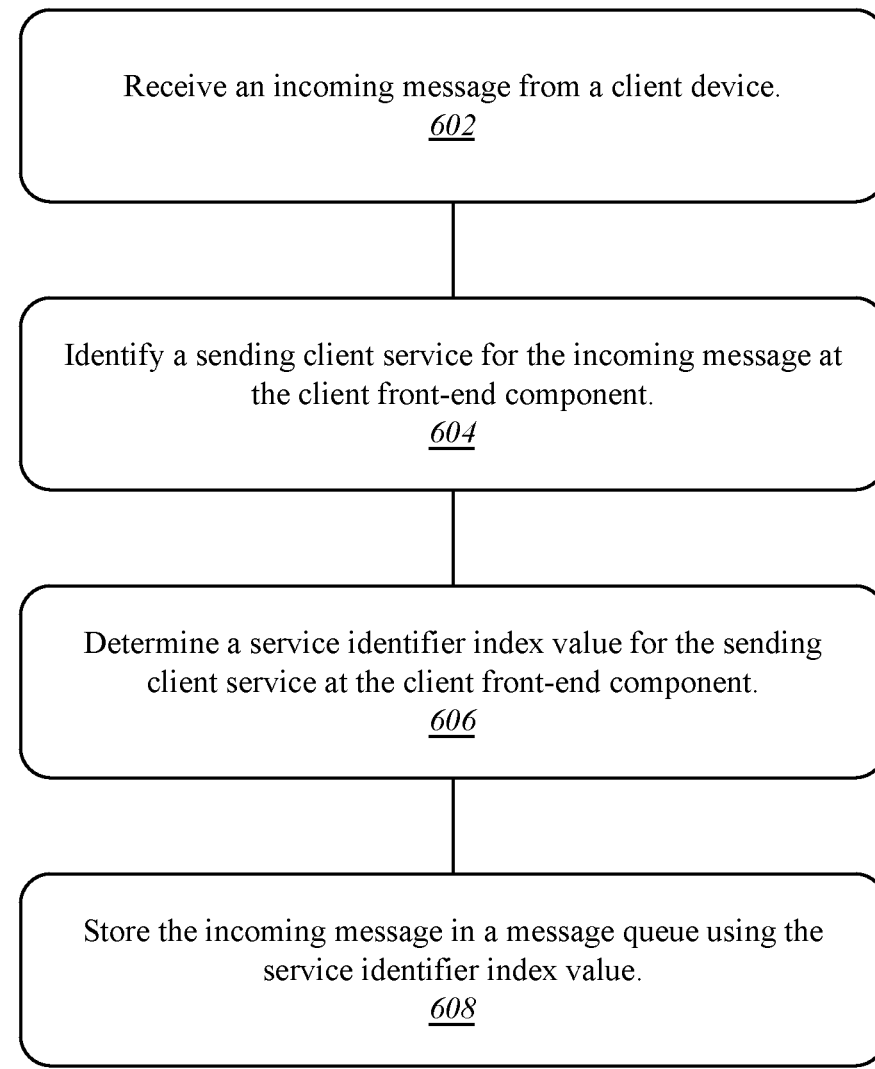
FIG. 6A illustrates an embodiment of a first logic flow for the messaging system of FIG. 1.

FIG. 6A illustrates one embodiment of a first logic flow 600. The logic flow 600 may be representative of some or all of the operations executed by one or more embodiments described herein.

In the illustrated embodiment shown in FIG. 6A, the logic flow 600 may receive an incoming message from a client device at block 602.

The logic flow 600 may identify a sending client service for the incoming message at the client front-end component at block 604.

The logic flow 600 may determine a service identifier index value for the sending client service at the client front-end component at block 606.

The logic flow 600 may store the incoming message in a message queue using the service identifier index value at block 608.

Figure 6B:
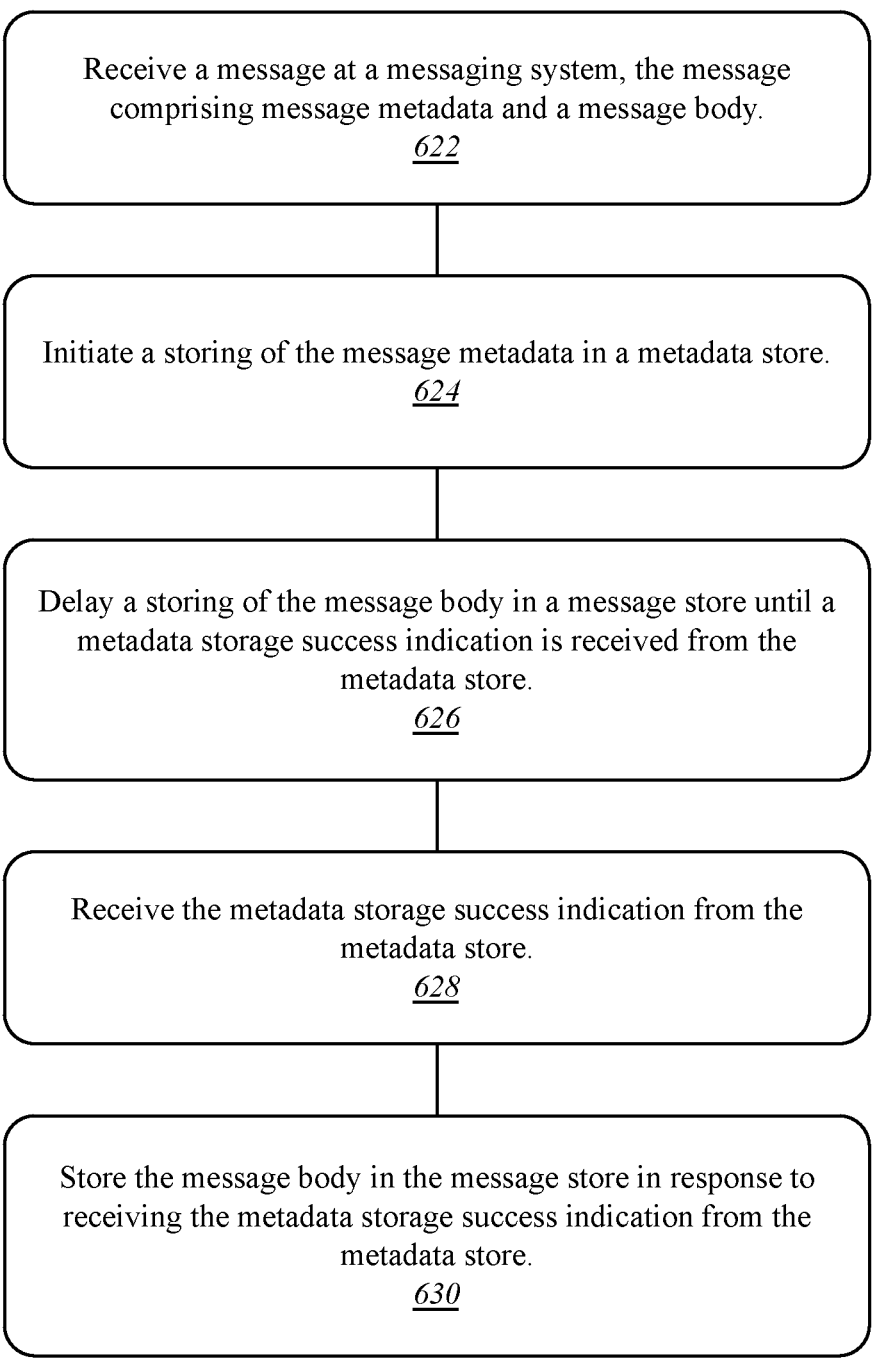
FIG. 6B illustrates an embodiment of a second logic flow for the messaging system of FIG. 1.

FIG. 6B illustrates one embodiment of a first logic flow 620. The logic flow 620 may be representative of some or all of the operations executed by one or more embodiments described herein.

In the illustrated embodiment shown in FIG. 6B, the logic flow 620 may receive a message at a messaging system, the message comprising message metadata and a message body at block 622.

The logic flow 620 may initiate a storing of the message metadata in a metadata store at block 624.

The logic flow 620 may delay a storing of the message body in a message store until a metadata storage success indication is received from the metadata store at block 626.

The logic flow 620 may receive the metadata storage success indication from the metadata store at block 628.

The logic flow 620 may store the message body in the message store in response to receiving the metadata storage success indication from the metadata store at block 630.

FIG. 6C illustrates one embodiment of a first logic flow 640. The logic flow 640 may be representative of some or all of the operations executed by one or more embodiments described herein.

In the illustrated embodiment shown in FIG. 6C, the logic flow 640 may receive a messaging client update request at a messaging system from a messaging client on a client device at block 642.

The logic flow 640 may retrieve a message metadata set from a metadata store of the messaging system, the message metadata set associated with a metadata set most-recent sequence identifier for the message metadata set at block 644.

The logic flow 640 may retrieve a message body set from a message store of the messaging system, wherein retrieving the message body set from the message store comprises providing the metadata set most-recent sequence identifier for the message metadata set to the message store, wherein the message store is operative to self-update with a message queue to at least the metadata set most-recent sequence identifier where a message store most-recent sequence identifier is less than the metadata set most-recent sequence identifier at block 646.

The logic flow 640 may provide the message metadata set and the message body set to the messaging client on the client device at block 648.

FIG. 6D illustrates one embodiment of a first logic flow 660. The logic flow 660 may be representative of some or all of the operations executed by one or more embodiments described herein.

In the illustrated embodiment shown in FIG. 6D, the logic flow 660 may receive a messaging client update request from a client device at a message cache for a messaging system at block 662.

The logic flow 660 may retrieve a message set from a message storage system in response to the messaging client update request at block 664.

The logic flow 660 may determine that the message set is an out-of-date message set at block 666.

The logic flow 660 may retrieve a recent message update set from a message queue, the recent message update set comprising a plurality of message updates at block 668.

The logic flow 660 may apply the plurality of message updates to the out-of-date message set to generate an up-to-date message set at block 670.

The logic flow 660 may provide the up-to-date message set to the client device at block 672.

The embodiments are not limited to these examples.

Figure 7:
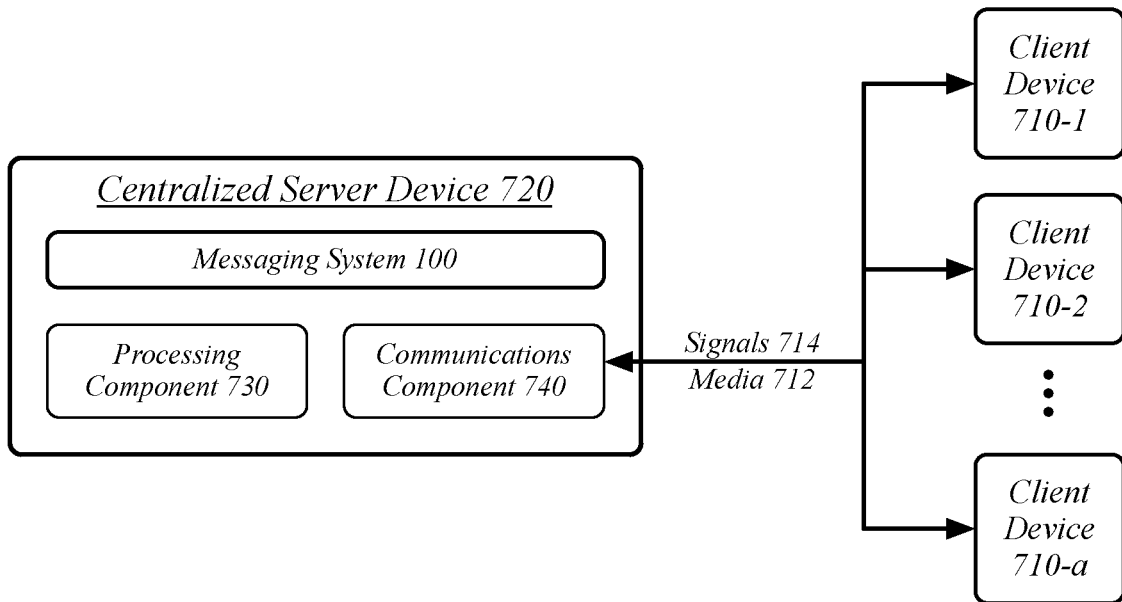
FIG. 7 illustrates an embodiment of a centralized system for the system of FIG. 1.

FIG. 7 illustrates a block diagram of a centralized system 700. The centralized system 700 may implement some or all of the structure and/or operations for the messaging system 100 in a single computing entity, such as entirely within a single centralized server device 720.

The centralized server device 720 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the messaging system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the messaging system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation. The centralized server device 720 may communicate with a plurality of client devices 710, providing messaging services to the client devices 710.

Figure 8:
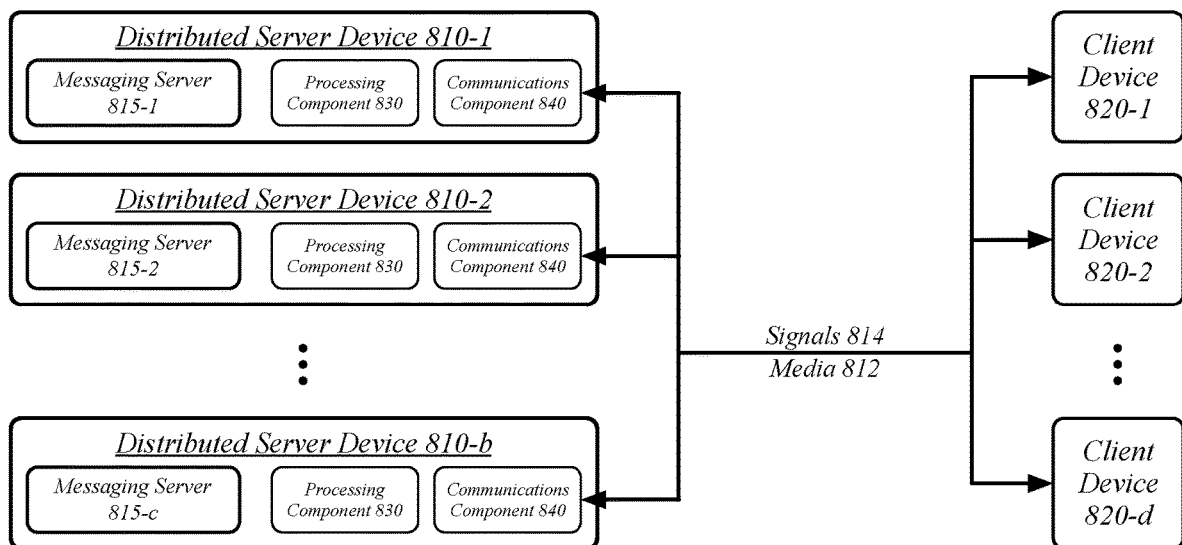
FIG. 8 illustrates an embodiment of a distributed system for the system of FIG. 1.

FIG. 8 illustrates a block diagram of a distributed system 800. The distributed system 800 may distribute portions of the structure and/or operations for the messaging system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 810. In general, the server devices 810 may be the same or similar to the centralized server device 710 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The plurality of distributed server devices 810 may comprise or employ one or more server programs that operate to perform various methodologies in accordance with the described embodiments. In one embodiment, for example, the plurality of distributed server devices 810 may each implement a messaging server 815. The messaging servers 815 may generally correspond to the messaging servers 110 and may implement the operations of the messaging system 100 across a plurality of computing devices.

Figure 9:
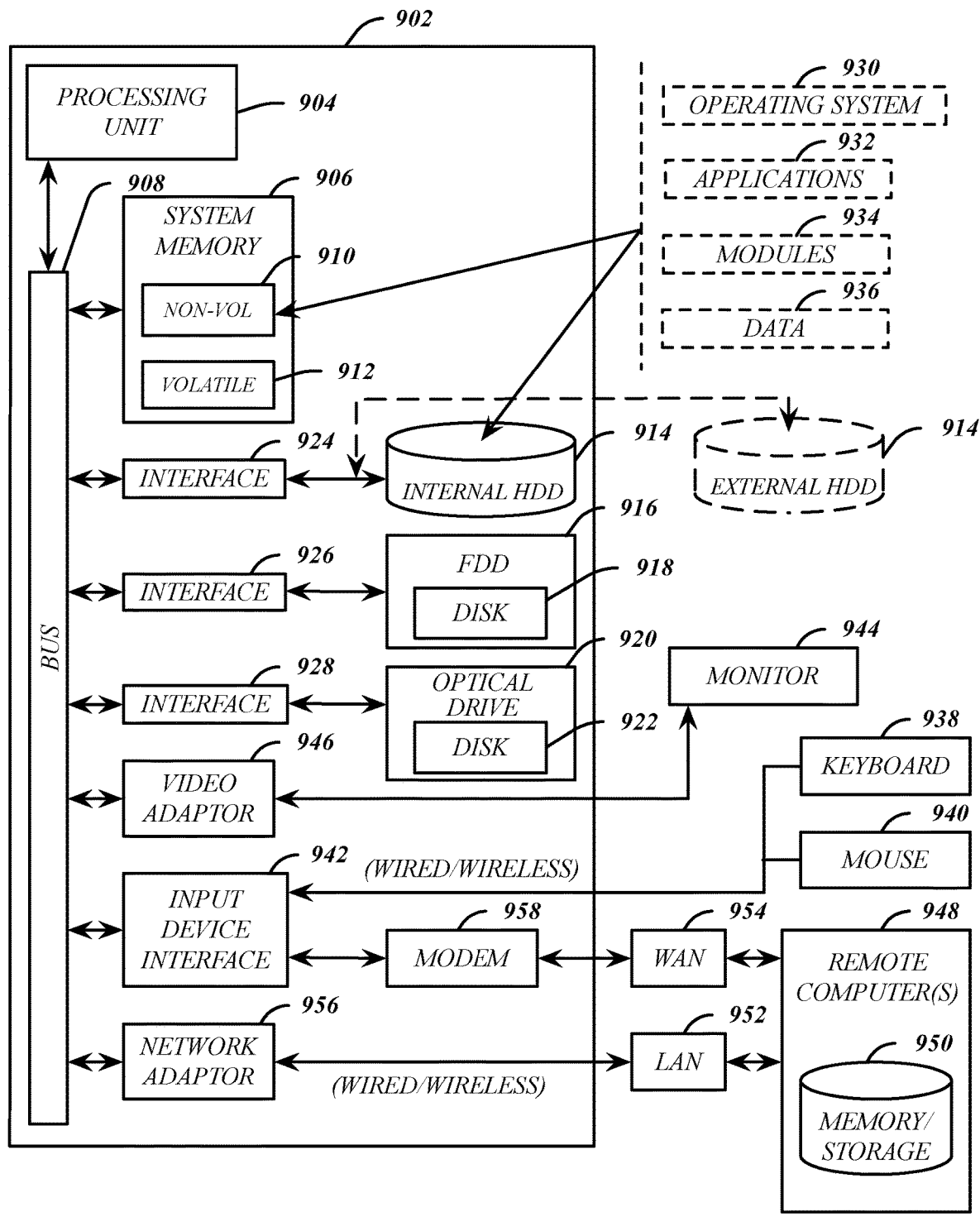
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the messaging system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
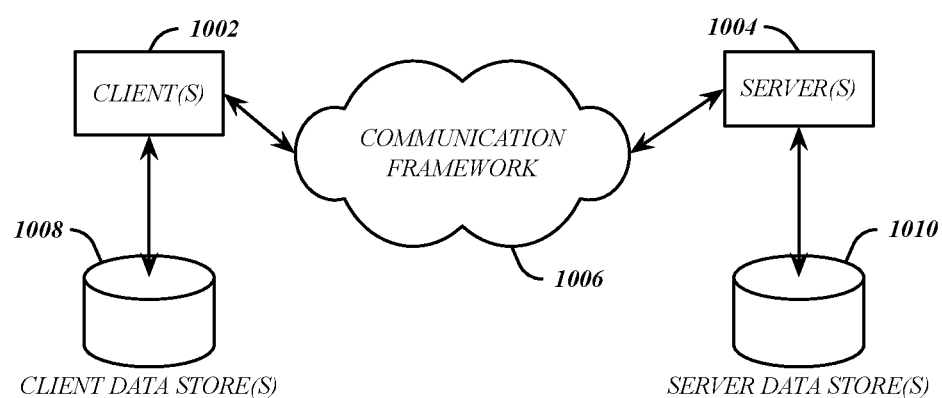
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may comprise various messaging clients on various client devices. The servers 1004 may comprise the messaging servers of the messaging system 100. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
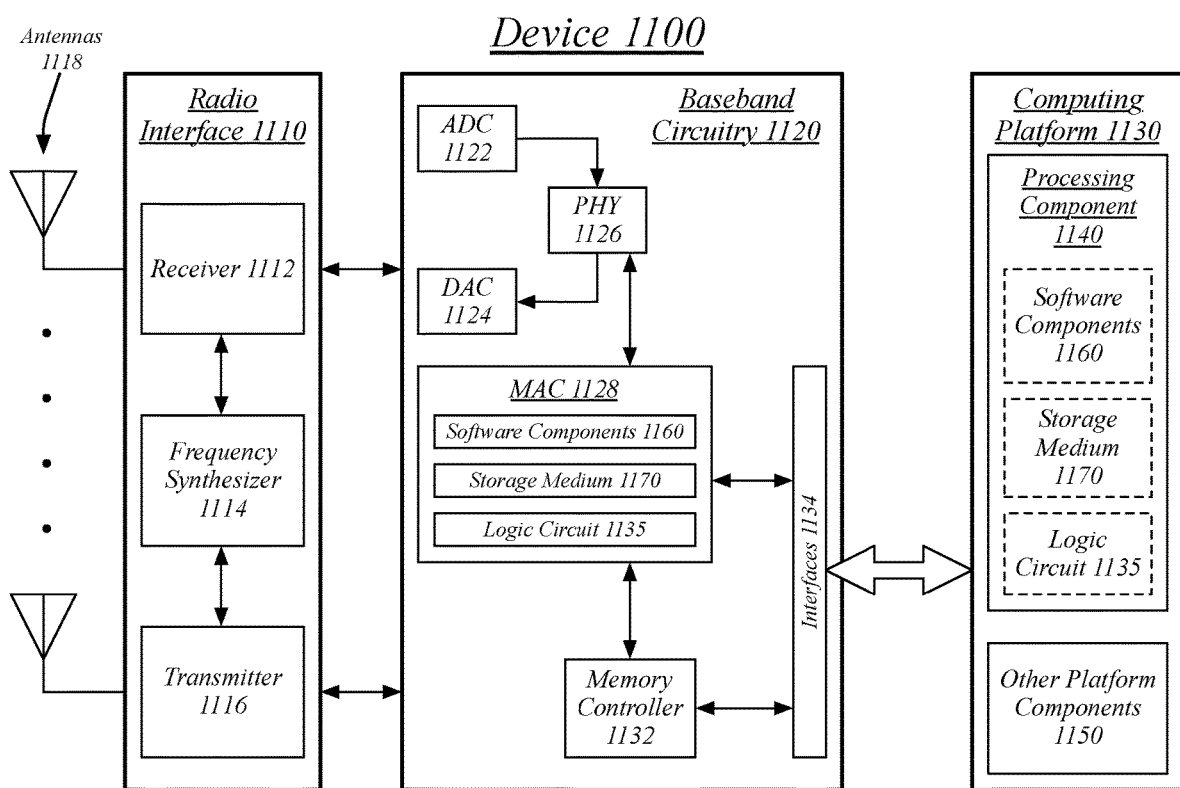
FIG. 11 illustrates an embodiment of a radio device architecture.

FIG. 11 illustrates an embodiment of a device 1100 for use in a multicarrier OFDM system, such as the messaging system 100. Device 1100 may implement, for example, software components 1160 as described with reference to messaging system 100 and/or a logic circuit 1135. The logic circuit 1135 may include physical circuits to perform operations described for the messaging system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the messaging system 100 and/or logic circuit 1135 in a single computing entity, such as entirely within a single device. Alternatively, the device 1100 may distribute portions of the structure and/or operations for the messaging system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the messaging system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an incoming message from a client device at a client front-end component for a messaging system; identifying a sending client service for the incoming message at the client front-end component; determining a service identifier index value for the sending client service at the client front-end component; and storing the incoming message in a message queue using the service identifier index value.

A computer-implemented method may further comprise the sending client service comprising a messaging-based commerce service.

A computer-implemented method may further comprise configuring the client front-end component for an additional client service based on adding an additional service identifier index value.

A computer-implemented method may further comprise the message queue operative to deliver the incoming message to a subscribing service based on the subscribing service being associated with the service identifier index value.

A computer-implemented method may further comprise storing the incoming message in a message queue using a plurality of indices, the plurality of indices comprising at least a read status, a message folder, and a thread type, wherein the service identifier index value is assigned as the thread type.

A computer-implemented method may further comprise wherein the message folder is assigned an ephemeral image service index value.

A computer-implemented method may further comprise the ephemeral image service index value corresponding to a user-profile-linked ephemeral image service.

A computer-implemented method may further comprise storing the incoming message in a message store using the service identifier index value as a thread type for a thread type index of the message store.

A computer-implemented method may further comprise receiving a message retrieval request from the client device, the message retrieval request identifying the service identifier index value as the thread type for the thread type index; and retrieving a plurality of messages based on using the service identifier index value with the thread type index; and returning the plurality of messages in response to the message retrieval request.

A computer-implemented method may further comprise the service identifier index value corresponding to a messaging-based commerce service, the message retrieval request corresponding to a commerce message thread view on the client device.

An apparatus may comprise a client front-end component of a messaging system operative to receive an incoming message from a client device; identify a sending client service for the incoming message at the client front-end component; determine a service identifier index value for the sending client service at the client front-end component; and store the incoming message in a message queue using the service identifier index value. The apparatus may be operative to implement any of the computer-implemented methods described herein.

A computer-implemented method may comprise receiving a message at a messaging system, the message comprising message metadata and a message body; initiating a storing of the message metadata in a metadata store; delaying a storing of the message body in a message store until a metadata storage success indication is received from the metadata store; receiving the metadata storage success indication from the metadata store; and storing the message body in the message store in response to receiving the metadata storage success indication from the metadata store.

A computer-implemented method may further comprise the metadata storage success indication indicating successful storage of the message metadata to the metadata store.

A computer-implemented method may further comprise the metadata store located on a first storage device system, the message store located on a second storage device system, the first storage device system distinct from the second storage device system.

A computer-implemented method may further comprise the first storage device system comprising a higher-speed storage device system than the second storage device system.

A computer-implemented method may further comprise storing the message body in the message store in response to receiving the metadata storage success indication from a secondary metadata store.

A computer-implemented method may further comprise delaying storing the message body in the message store until the metadata storage success indication is received and a metadata replicated storage success indication is received; receiving the metadata replicated storage success indication; and storing the message body in the message store in response to receiving the metadata storage success indication and the metadata replicated storage success indication.

A computer-implemented method may further comprise the metadata replicated storage success indication indicating successful replication of the message metadata to one or more secondary metadata stores.

A computer-implemented method may further comprise the message received as a message mutation, further comprising: storing the message mutation in the metadata store in association with the message metadata as a temporary cache of the message mutation.

An apparatus may comprise a client front-end component of a messaging system operative to receive a message, the message comprising message metadata and a message body; and store the message in a message queue; and the message queue operative to initiate a storing of the message metadata in a metadata store; delay a storing of the message body in a message store until a metadata storage success indication is received from the metadata store; receive the metadata storage success indication from the metadata store; and store the message body in the message store in response to receiving the metadata storage success indication from the metadata store. The apparatus may be operative to implement any of the computer-implemented methods described herein.

A computer-implemented method may comprise receiving a messaging client update request at a messaging system from a messaging client on a client device; retrieving a message metadata set from a metadata store of the messaging system, the message metadata set associated with a metadata set most-recent sequence identifier for the message metadata set; retrieving a message body set from a message store of the messaging system, wherein retrieving the message body set from the message store comprises providing the metadata set most-recent sequence identifier for the message metadata set to the message store, wherein the message store is operative to self-update with a message queue to at least the metadata set most-recent sequence identifier where a message store most-recent sequence identifier is less than the metadata set most-recent sequence identifier; and providing the message metadata set and the message body set to the messaging client on the client device.

A computer-implemented method may further comprise combining the message metadata set and message body set into a message set; and providing the message metadata set and message body set to the messaging client on the client device as the message set.

A computer-implemented method may further comprise providing the message metadata set and message body set to the messaging client on the client device with a messaging client update request sequence identifier set to the metadata set most-recent sequence identifier.

A computer-implemented method may further comprise wherein the message store is operative to provide the message body set at a messaging recency based on the metadata set most-recent sequence identifier.

A computer-implemented method may further comprise the metadata store located on a first storage device system, the message store located on a second storage device system, the first storage device system distinct from the second storage device system.

A computer-implemented method may further comprise the first storage device system comprising a higher-speed storage device system than the second storage device system.

A computer-implemented method may further comprise the messaging client on the client device operative to ignore one or more messages that are represented in the message body set but not represented in the message metadata set.

A computer-implemented method may further comprise the message metadata set and the message body set corresponding to a plurality of messages, wherein each of the plurality of the messages comprises one of an added message, a message deletion, a timestamp-based batch message deletion, and an end-state-based message amendment.

An apparatus may comprise a client front-end component of a messaging system operative to receive a messaging client update request from a messaging client on a client device; and provide a message metadata set and a message body set to the messaging client on the client device in response to the messaging client update request; and a message cache component of the messaging system operative to retrieve the message metadata set from a metadata store of the messaging system, the message metadata set associated with a metadata set most-recent sequence identifier for the message metadata set; and retrieve the message body set from a message store of the messaging system, wherein retrieving the message body set from the message store comprises providing the metadata set most-recent sequence identifier for the message metadata set to the message store, wherein the message store is operative to self-update with a message queue to at least the metadata set most-recent sequence identifier where a message store most-recent sequence identifier is less than the metadata set most-recent sequence identifier. The apparatus may be operative to implement any of the computer-implemented methods described herein.

A computer-implemented method may comprise receiving a messaging client update request from a client device at a message cache for a messaging system; retrieving a message set from a message storage system in response to the messaging client update request; determining that the message set is an out-of-date message set; retrieving a recent message update set from a message queue, the recent message update set comprising a plurality of message updates; applying the plurality of message updates to the out-of-date message set to generate an up-to-date message set; and providing the up-to-date message set to the client device.

A computer-implemented method may further comprise the message storage system comprising a primary replicated message store and a secondary replicated message store, wherein the message set is retrieved from the secondary replicated message store, wherein the secondary replicated message store returns the out-of-date message set based on the secondary replicated message store being behind a primary replicated message store.

A computer-implemented method may further comprise selecting the secondary replicated message store for retrieving the message set based on the primary replicated message store being unavailable.

A computer-implemented method may further comprise selecting the secondary replicated message store for retrieving the message set based on the secondary replicated message store being more geographically proximate to the message cache than the primary replicated message store.

A computer-implemented method may further comprise retrieving the recent message update set from the message queue based on a most-recent sequence identifier for the out-of-date message set, wherein the recent message update set retrieved from the message queue comprises the plurality of message updates that are more recent than the most-recent sequence identifier.

A computer-implemented method may further comprise caching the up-to-date message set in the message cache.

A computer-implemented method may further comprise caching the up-to-date message set in the message cache based on a message cache retention time that is less than a message queue retention time for the message queue.

A computer-implemented method may further comprise the message queue operative to retain messages until the messages are stored in the message storage system.

An apparatus may comprise a client front-end component of a messaging system operative to receive a messaging client update request from a client device; retrieve an up-to-date message set from a message cache component of the messaging system; and provide the up-to-date message set to the client device; and the message cache component operative to retrieve a message set from a message store in response to the messaging client update request; determine that the message set is an out-of-date message set; retrieve a recent message update set from a message queue, the recent message update set comprising a plurality of message updates; and apply the plurality of message updates to the out-of-date message set to generate an up-to-date message set. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving an incoming message from a client device, the incoming message identifying a sending client service;
determining a service identifier index value based on the sending client service;
storing the incoming message in a message queue using at least a first index value of a thread type index, the service identifier index value being assigned as the first index value;
sending the incoming message to a subscribing service based on the service identifier index value from the thread type index; and
assigning an additional service identifier index value as a second index value of the thread type index for supporting an additional client service different from the sending client service associated with the service identifier index value, the second index value being different from the first index value, and
wherein the first and second index values are associated with a same index of a database, the same index being the thread type index, and
wherein the first and second index values act or operate as indices for the sending client service and the additional client service, respectively, without adding a separate index for each of the sending client service and the additional client service to the database.

2. The method of claim 1, the sending client service comprising a messaging-based commerce service.

3. The method of claim 1,
wherein the additional client service is supported without adding an additional index to a message store.

4. The method of claim 1, the message queue operative to deliver the incoming message to a subscribing service based on the subscribing service being associated with the service identifier index value.

5. The method of claim 1, further comprising:
storing the incoming message in a message store using the service identifier index value as a thread type for a thread type index of the message store.

6. The method of claim 5, further comprising:
receiving a message retrieval request from the client device, the message retrieval request identifying the service identifier index value as the thread type for the thread type index; and
retrieving a plurality of messages based on using the service identifier index value with the thread type index; and
returning the plurality of messages in response to the message retrieval request.

7. An apparatus, comprising:
at least one processor operable to execute stored instructions that, when executed, causes the at least one processor to:
receive an incoming message from a client device, the incoming message identifying a sending client service;
determine a service identifier index value based on the sending client service;
store the incoming message in a message queue using at least a first index value of a thread type index, the service identifier index value being assigned as the first index value;
send the incoming message to a subscribing service based on the service identifier index value from the thread type index; and
assign an additional service identifier index value as a second index value of the thread type index for supporting an additional client service different from the sending client service associated with the service identifier index value, the second index value being different from the first index value, and
wherein the first and second index values are associated with a same index of a database, the same index being the thread type index, and
wherein the first and second index values act or operate as indices for the sending client service and the additional client service, respectively, without adding a separate index for each of the sending client service and the additional client service to the database.

8. The apparatus of claim 7, the sending client service comprising a messaging-based commerce service.

9. The apparatus of claim 7, the message queue operative to deliver the incoming message to a subscribing service based on the subscribing service being associated with the service identifier index value.

10. The apparatus of claim 7, further comprising wherein the at least one processor is further caused to:
store the incoming message in a message store using the service identifier index value as a thread type for a thread type index of the message store.

11. The apparatus of claim 7, wherein the at least one processor is further caused to:
receive a message retrieval request from the client device, the message retrieval request identifying the service identifier index value as the thread type for the thread type index; and retrieve a plurality of messages based on using the service identifier index value with the thread type index; and return the plurality of messages in response to the message retrieval request.

12. At least one non-transitory computer-readable storage medium comprising instructions that, when executed, cause a system to:
receive an incoming message from a client device, the incoming message identifying a sending client service;
determine a service identifier index value based on the sending client service;
store the incoming message in a message queue using at least a first index value of a thread type index, the service identifier index value being assigned as the first index value;
send the incoming message to a subscribing service based on the service identifier index value from the thread type index; and
assign an additional service identifier index value as a second index value of the thread type index for supporting an additional client service different from the sending client service associated with the service identifier index value, the second index value being different from the first index value, and
wherein the first and second index values are associated with a same index of a database, the same index being the thread type index, and
wherein the first and second index values act or operate as indices for the sending client service and the additional client service, respectively, without adding a separate index for each of the sending client service and the additional client service to the database.

13. The at least one non-transitory computer-readable storage medium of claim 12, the sending client service comprising a messaging-based commerce service.

14. The at least one non-transitory computer-readable storage medium of claim 12, wherein the additional client service is supported without adding an additional index to a message store.

15. The at least one non-transitory computer-readable storage medium of claim 12, the message queue operative to deliver the incoming message to a subscribing service based on the subscribing service being associated with the service identifier index value.

16. The at least one non-transitory computer-readable storage medium of claim 12, comprising further instructions that, when executed, cause a system to:
store the incoming message in a message store using the service identifier index value as a thread type for a thread type index of the message store.

17. The at least one non-transitory computer-readable storage medium of claim 12, comprising further instructions that, when executed, cause a system to:
receive a message retrieval request from the client device, the message retrieval request identifying the service identifier index value as the thread type for the thread type index; and
retrieve a plurality of messages based on using the service identifier index value with the thread type index; and
return the plurality of messages in response to the message retrieval request.

* * * * *